Patented Oct. 1, 1929

1,730,081

UNITED STATES PATENT OFFICE

ARTHUR LÜTTRINGHAUS AND FILIP KAČER, OF MANNHEIM, GERMANY, ASSIGNORS TO GENERAL ANILINE WORKS, INC., OF NEW YORK, N. Y., A CORPORATION OF DELAWARE

PRODUCTION OF KETONES OF THE ANTHRACENE SERIES

No Drawing. Application filed January 26, 1928, Serial No. 249,767, and in Great Britain February 16, 1927.

This application is a continuation-in-part of our application Serial No. 178,134, filed Mar. 24, 1927.

According to the process of the said application for Patent Serial No. 178,134, anthracyl-alkyl-ketones are produced by the action of fatty-acid halogenides on anthracene, or its homologues or derivatives, in the presence of a condensing agent, the products varying in accordance with the working conditions employed.

When working under rigorous conditions alpha- or beta-anthracyl-alkyl-ketones, or mixtures of the same, are obtained.

We have found that the said alpha- or beta-anthracyl-alkyl-ketones, which are hereinafter, for the sake of brevity, referred to as anthracyl-alkyl-ketones, are converted into anthraquinonyl-alkyl-ketones by treatment with oxidizing agents, such as chromic acid dissolved in glacial acetic acid. Thus for example alpha- or beta-anthracyl-methyl-ketone yield alpha- or beta-anthraquinonyl-methyl-ketone respectively and 1.5-diaceto-anthracene yields 1.5-diacetoanthraquinone. The resulting anthraquinone derivatives form valuable starting materials for the production of dyestuffs.

The following examples will further illustrate the nature of the said invention which, however, is not limited to these examples. The parts are by weight.

Example 1

10 parts of alpha-anthracyl-methyl-ketone, obtainable according to Example 1 of the said application for Patent Serial No. 178,134, are heated to boiling with 100 parts of glacial acetic acid, and 12 to 13 parts of chromic anhydrid are slowly added so that the liquid remains in gentle ebullition. It is then diluted with water, and the deposited alpha-anthraquinonyl-methyl-ketone is filtered off by suction, washed and dried. On recrystallization from alcohol, it forms pale yellow needles having a melting point of from 158 to 160° C. The product obtained probably has the formula:

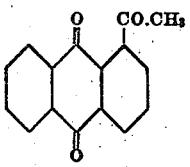

If beta-anthracyl-methyl-ketone be treated in the same manner, it furnishes beta-anthraquinonyl-methyl-ketone having a melting point of from 140° to 142° C. The alpha-ketone gives a red vat, and the beta-ketone a green vat. The beta-ketone probably has the formula:

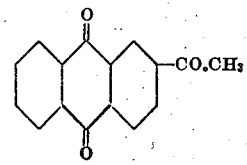

Example 2

10 parts of 2-propionyl anthracene, obtainable according to Example 5 of the said application for Patent Serial No. 178,134, are boiled with 100 parts of glacial acetic acid, 12 to 13 parts of chromic acid anhydrid are then added gradually in such a manner that the liquid remains in gentle ebullition. The mixture is then diluted with water and the 2-propionyl-anthraquinone, which separates out is filtered off by suction, washed and dried. On recrystallization from alcohol the product is obtained in the form of pale yellow needles melting at between 138 and 140° C. and furnishes a green hydrosulfite vat. The product probably corresponds to the formula:

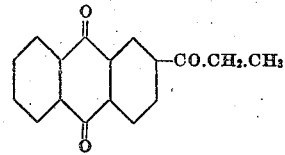

Example 3

10 parts of diaceto-anthracene melting at between 212° and 215° C., obtainable according to Example 6 of the said application for Patent Serial No. 178,134, are boiled with 100 parts of glacial acetic acid. 8.5 parts of chromic acid anhydrid are then added gradually in such a manner that the liquid remains in gentle ebullition. The mixture is then diluted with water and the diaceto-anthraquinone which separates out, is filtered off, washed and dried. On recrystallization from glacial acetic acid, a product is obtained melting at 318 to 319° C.

On condensation with hydrazine, glacial acetic acid being employed as solvent, a dispyridazine free from oxygen is obtained, thus proving that the acetyl groups are present in the 1- and 4- or 1- and 5-positions in accordance with the formulae:

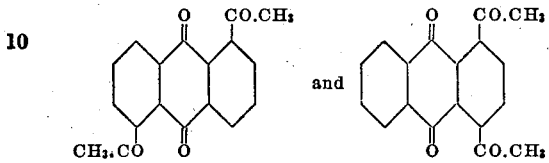

What we claim is:

1. As new articles of manufacture β-alkyl-anthraquinonyl-alkyl-ketones.

2. As a new article of manufacture β-methyl-anthraquinonyl-ketone.

3. A process for the production of anthraquinonyl-alkyl-ketones, which consists in treating anthracyl-alkyl-ketones with oxidizing agents.

4. A process for the production of anthraquinonyl-alkyl-ketones, which consists in treating anthracyl-alkyl-ketones with chromic acid dissolved in glacial acetic acid.

5. A process for the production of β-methyl-anthraquinonyl-ketone, which consists in treating β-anthracyl-methyl-ketone with chromic acid dissolved in glacial acetic acid, the solvent being maintained in gentle ebullition.

In testimony whereof we have hereunto set our hands.

ARTHUR LÜTTRINGHAUS.
FILIP KAČER.